Figure 8:
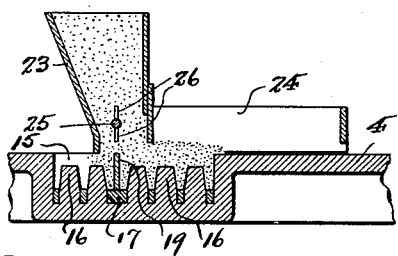

Feb. 17, 1931.  J. KNECHT  1,792,844
MACHINE FOR MAKING ARTIFICIAL BUILDING STONE
Filed Sept. 18, 1929    4 Sheets-Sheet 1
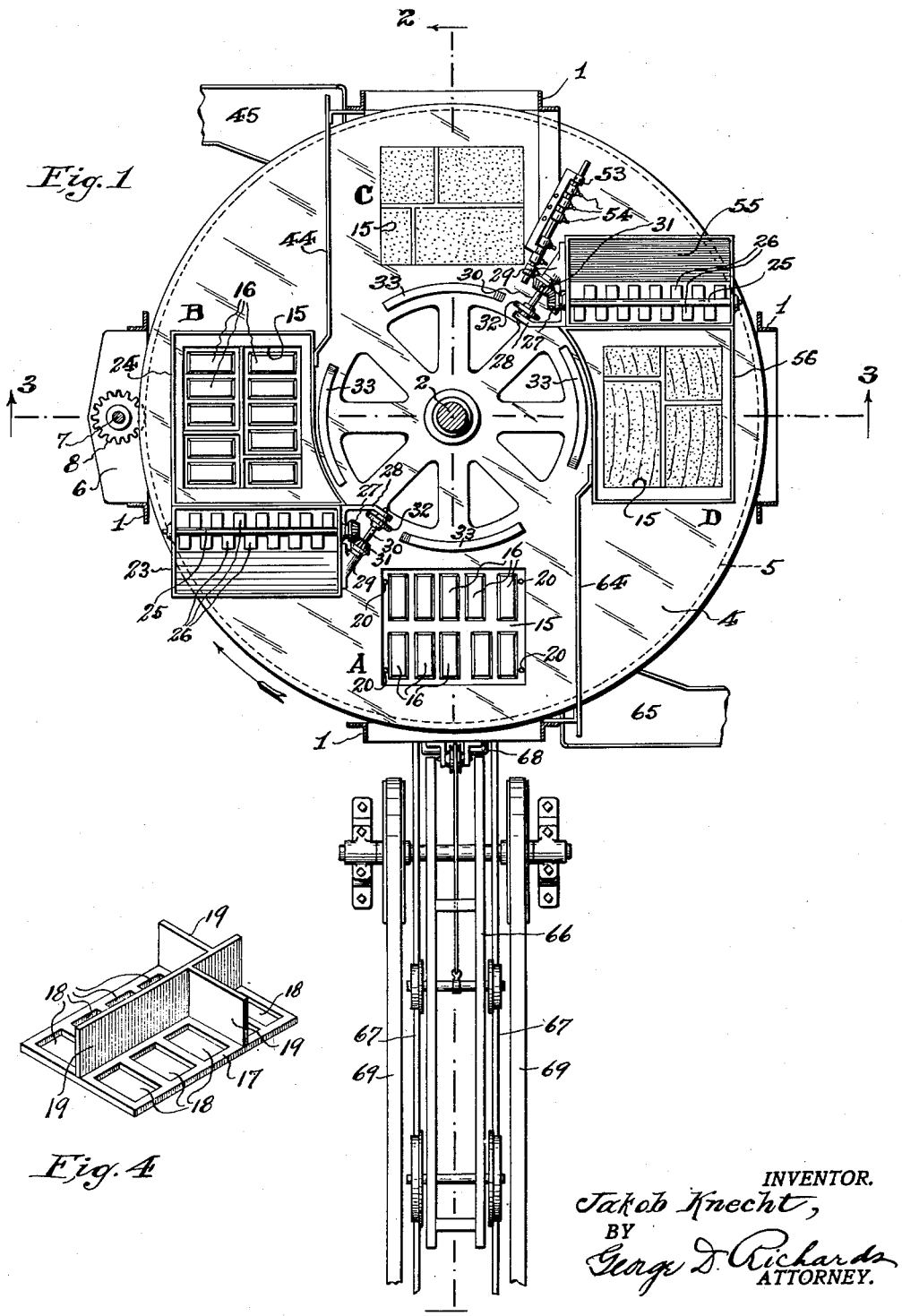
INVENTOR.
Jakob Knecht,
BY
George D. Richards
ATTORNEY.

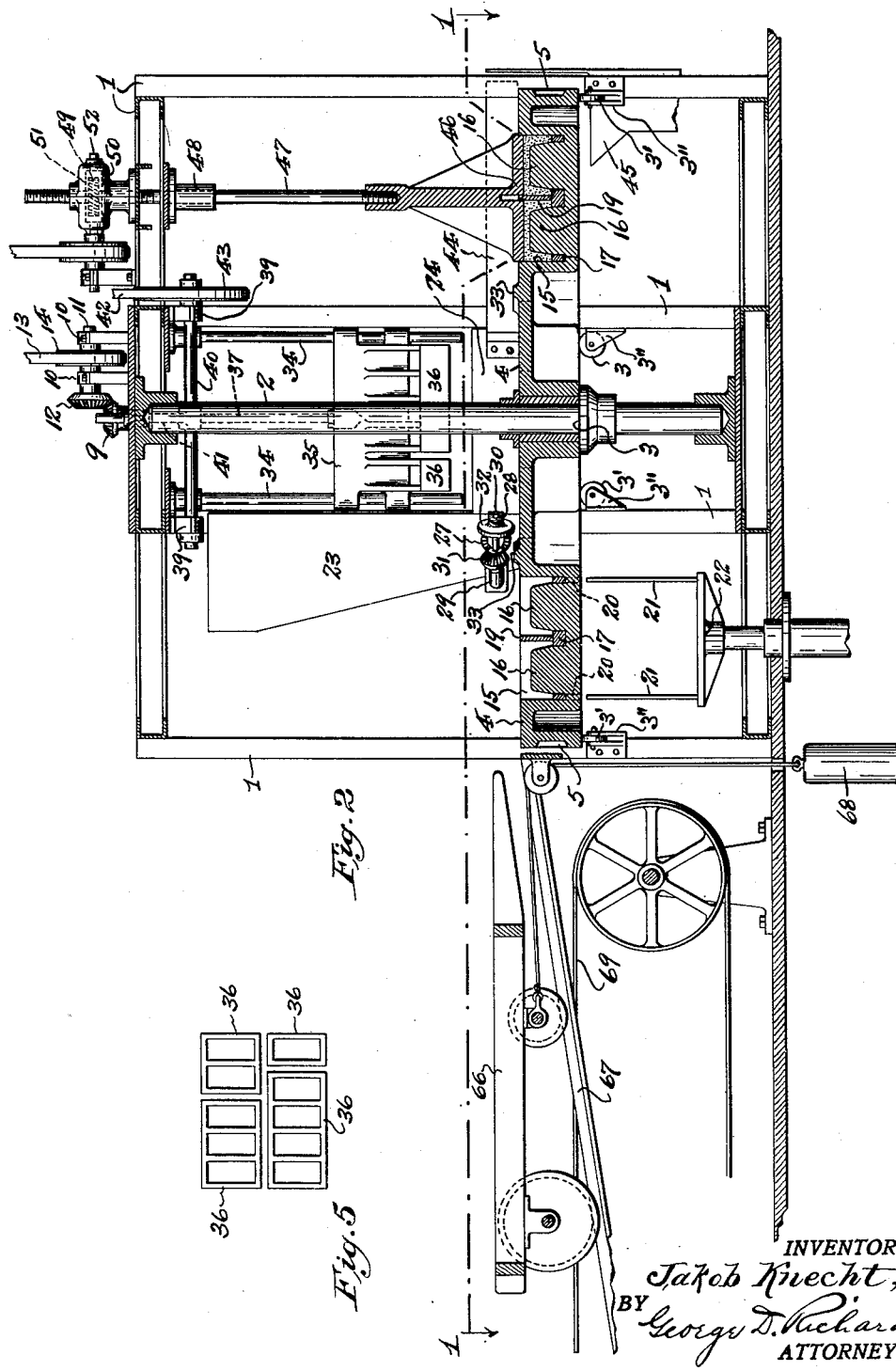

Feb. 17, 1931.　　　　　J. KNECHT　　　　　1,792,844
MACHINE FOR MAKING ARTIFICIAL BUILDING STONE
Filed Sept. 18, 1929　　4 Sheets-Sheet 3
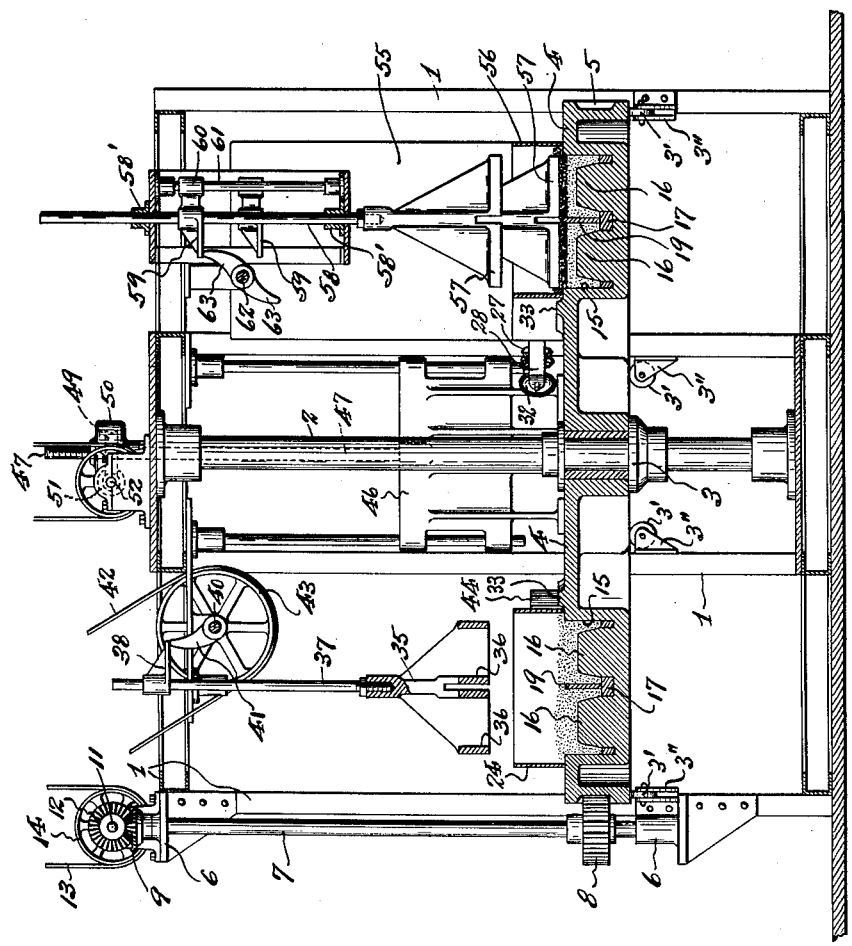
INVENTOR.
Jakob Knecht
BY
George D. Richards
ATTORNEY.

Feb. 17, 1931.   J. KNECHT   1,792,844
MACHINE FOR MAKING ARTIFICIAL BUILDING STONE
Filed Sept. 18, 1929   4 Sheets-Sheet 4

INVENTOR.
Jacob Knecht,
BY
George D. Richards
ATTORNEY.

Patented Feb. 17, 1931

1,792,844

UNITED STATES PATENT OFFICE

JAKOB KNECHT, OF UNION, NEW JERSEY

MACHINE FOR MAKING ARTIFICIAL BUILDING STONE

Application filed September 18, 1929. Serial No. 393,385.

This invention relates to a novel machine for making artificial building stone units by a molding process.

This invention has for its principal object to provide a novel machine for the purposes mentioned, comprising a rotatable turn-table or mold plate having a plurality of mold pockets or cavities formed therein, in combination with which are provided various means for supplying plastic material to the mold pockets or cavities, for tamping the material in mold pockets or cavities, and for ejecting finished building stone units from the molds; said various means being located at different stations about the turn-table or mold plate, so that the various operations are progressively carried on as the said turn-table or mold is rotated intermittently or step by step relative to said stations.

The invention has for a further object to provide, in a building stone molding machine of the general type above indicated, a novel base frame, for insertion in the mold pockets or cavities of machine, upon which the molded material is supported, and in conjunction with which an ejection means cooperates for removing the finished product from the mold-pockets or cavities.

The invention has for another object to provide a molding machine for producing a novel form of artificial building stone comprising a base mass of plastic material having a facing layer of ornamental character, in which means are provided for handling and supplying the two materials to the mold pockets or cavities and for so treating and manipulating the same as to assure the proper union of the two materials in the desired integral mass forming the finished product.

Other objects of this invention, not at this time more particularly enumerated, will be clearly understood from the following detailed description of the same.

An illustrative embodiment of this invention is shown in the accompanying drawings, in which:—

Fig. 1 is a horizontal section of a novel molding machine made according to this invention, said section being taken on line 1—1 in Fig. 2; Fig. 2 is a vertical section of the machine, taken on line 2—2 in said Fig. 1; Fig. 3 is a vertical section of the machine, taken on line 3—3 in said Fig. 1; Fig. 4 is a perspective view of a base frame used in the mold pockets or cavities of the machine; Fig. 5 is a bottom view a preliminary tamper means employed in the machine; Fig. 6 is a bottom view of a press means employed in the machine; and Fig. 7 is a bottom view of a finish tamper means employed in the machine.

Figs. 8 to 16 are fragmentary sectional views of the turn-table or mold plate and associated apparatus showing the successive operations carried on in the machine during the production of the molded artificial stone building units.

Similar characters of reference are employed in all of the hereinabove described views, to indicate corresponding parts.

Referring now to said drawings, the reference character 1 indicates any suitable form of frame-work in connection with which the working parts of the machine are mounted in operative associated relation. Mounted centrally of said frame-work is a vertical column or shaft 2 having a bearing support 3. Rotatably engaged on said column or shaft 2, and supported in desired position by said bearing support 3, is a turn-table or mold plate 4. Said turn-table or mold plate 4 is provided at and around its periphery with gear teeth 5. Journaled in bearing brackets 6, fixed in connection with and at one side of the frame-work 1, is a driven shaft 7 which carries a spur gear 8. Said spur gear 8 meshes with the gear teeth 5 of the turn-table or mold-plate 4. On the upper end of said driven shaft 7 is a bevel gear 9, and supported in bearings 10, carried by the frame-work 1, is a driving shaft 11 having a bevel gear 12 to mesh with said bevel gear 9. Power from a suitable source may be suitably applied to said driving shaft 11, as by belt 13 and pulley 14. The power thus applied is transmitted to the turn-table or mold plate whereby the same is rotated. Preferably the rotation of the turn-table or mold plate is intermittent in quarter turn steps, and any suitable means (not shown) for controlling the transmission of power to produce such operation may be employed, between the driving shaft 11 and source of power, or otherwise as may be deemed expedient. To further support the turn-table or mold plate for free turning movement with as little friction as possible, roller bearings 3' are provided to engage the underside of the marginal portions of said turn-table or mold plate. These roller bearings 3' are rotatably supported in carrying brackets 3" secured to the frame-work 1.

Formed in the body of said turn-table or mold plate 4, so as to open at the upper surface thereof, are a series of mold pockets or cavities 15, the same being spaced equally around the axis of the turn-table or mold plate 14. As shown in the drawings there are four of these mold pockets or cavities. I do not limit myself expressly to such number however, since more or less than four may be employed, and the intermittent or step by step rotation of the turn-table or mold plate governed accordingly. Said mold-pockets or cavities are provided with suitably disposed and grouped cores 16 to produce desired hollow formed molded units. Preferably the mold pockets or cavities 15 and their cores 16 are arranged to produce at each molding a group of artificial building stone units of varying sizes as to length but otherwise of uniform width and depth. For example, as indicated in the drawings, each molding produces a single, a double, a triple and a quadruple unit. In order to facilitate both the molding and the handling of such groups of the product, each mold pocket or cavity 15 is provided with a removable base frame (see Fig. 4), the same comprising a base frame 17, having rectangular spaced perforations 18 corresponding to the desired disposition, number and location of the mold pocket cores 16, with which base frame are associated upright division boards or partitions 19 to separate the different units to be produced. The mold pockets or cavities 15 are of such depth as to permit the insertion of the base frames 17 therein so that the same lie in the bottom of the same, thus forming a removable support within the mold pockets or cavities upon which the plastic material rests while undergoing the molding operations. The bottom wall proper of each mold pocket or cavity is provided with vertical slideways or openings 20 over which the base frames 17 lie. These slideways or openings 20 permit the upward passage of lift rods 21 of a vertically reciprocable ejector device 22, so that at proper times the lift rods may be thrust upwardly through the mold pockets or cavities to engage and lift the base frames with the finished product thereon upwardly and out of the mold pockets or cavities, as will be hereinafter further explained.

As shown in the accompanying drawings there are four main stations equi-spaced around the turn-table or mold plate, at which stations are respectively located the various apparatus for carrying on the different stages of operation required to produce the molding of the product. Referring to Fig. 1 of the drawings these stations are generally indicated therein by the reference characters A, B, C and D.

Station A provides the point where the molding operations are initiated and to which point the finished product is returned for removal from the machine. To initiate the molding operations, while a mold pocket or cavity 15 is at rest at station A, a base frame 17 together with partitions 19 are inserted in the empty pocket or cavity, after which the turn table is caused to make a quarter turn to thereby carry the empty pocket or cavity with the inserted base frame and partitions to station B. Located adjacent to station B is a supply hopper 23 in which is deposited a supply of the base material from which the main body of the molded product is formed. The base material may consist in plastic concrete, or sand and cement mixture or like plastic material. The bottom of said hopper 23 is open to the surface of the turn-table or mold plate 4, and is located in the path of movement of the mold pockets or cavities as they move from station A to station B. Extending beyond said hopper 23, so as to surround the position of a mold pocket or cavity as it arrives and dwells at station B, is coaming 24 for confining the plastic material delivered into the mold pocket or cavity against undue spreading or scattering on the surface of the turn-table or mold plate. Journaled in the lower end of the hopper 23 is a shaft 25 having diametrically extending or radiating paddles 26. The exterior end of said shaft 25 is provided with a bevel gear 27. Journaled in bearing supports 28—29, which are affixed to the side of said hopper toward the inner portions of said turn-table or mold plate, is a drive shaft 30 carrying a bevel gear 31 to mesh with and drive said bevel gear 27. Also fixed on said shaft 30 is a friction wheel 32. Fixed on said turn-table or mold plate, adjacent to the inner side of each mold pocket or cavity thereof, is a raised arcuate traction member 33. As the turn-table or mold plate is rotated to carry a mold pocket or cavity from station A to station B, and as the leading end of said mold pocket or cavity enters beneath the hopper 23, said traction member 33 will engage the friction wheel 32 and, as it moves thereunder, will rotate the same to in turn rotate the shaft 25 and its paddles 26 while the mold pocket or cavity means moves past the bottom of the hopper 23. This actuation of the paddles 26 will assure a downward flow of plastic base material from the hopper into the mold pocket or cavity, so that a proper amount of material will be deposited in the latter by the time it comes to rest at station B. This operation is illustrated in Fig. 8 of the drawings.

Figure 9:
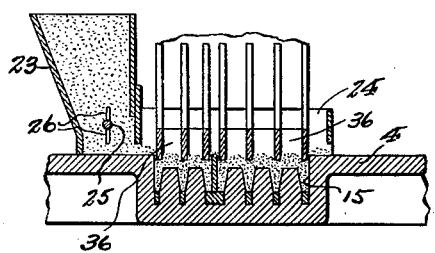
Figure 10:
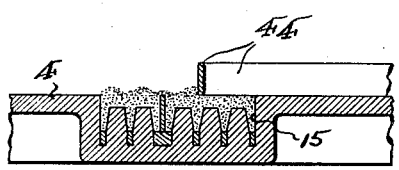
Figure 11:
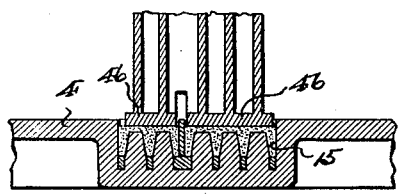
Figure 12:
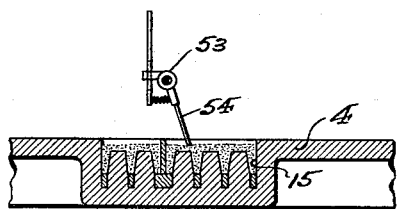
Figure 13:
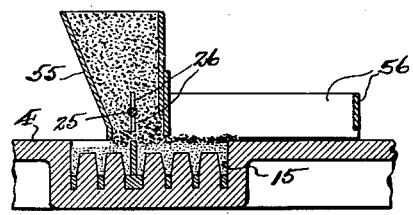

Registered above the position of the mold pocket or cavity, as it dwells at station B, is a preliminary tamper mechanism. This tamper mechanism may be made and operated in various ways, but, as illustrated, comprises a pair of guide rods 34 suspended from the upper portion of the frame-work 1. Slidably reciprocable on said guide rods 34 is a tamper head 35 having hollow rectangular tamper feet 36 conforming in position to the location of the web walls of the artificial building stone units to be formed in the mold pockets or cavities. Connected with the upper end of said tamper head 35 is a vertically and upwardly projecting lift arm 37 having, adjacent to its upper end, a fixed laterally projecting lift tongue 38. Journaled in bearings 39 carried by the frame-work 1 is a shaft 40, to which is fixed a revolvable trip arm 41. Said shaft 40 may be rotated at proper times by any suitable form of power transmission means, such. e. g. as the belt 42 and pulley 43. While a mold pocket or cavity, with the charge of plastic base material therein, is caused to dwell at station B, said preliminary tamper mechanism is set in motion, whereupon the revolving trip-arm 41 engages and raises the lift tongue 38 to in turn draw upward the tamper head 35 and then release the same subject to gravitation, whereby its fall carries the tamper feet 36 in tamping contact with the plastic material to pack the same firmly into the spaces around the cores of the mold pocket or cavity. The tamping operation thus provided for is carried on for a desired length of time determined only by the duration of dwell of the mold pocket or cavity at station B. This tamping operation is illustrated in Fig. 9 of the drawings.

The delivery and tamping of the base material into the mold pocket or cavity having been completed, the turn-table or mold plate is again caused to move, whereby the filled mold pocket or cavity is transferred from station B to station C. Suitably fixed to extend over the surface of the turn-table or mold plate, at points intermediate station B and station C, is a strike-off plate 44, disposed edgewise to said surface. As the mold pocket or cavity travels beneath said strike-off plate 44, any excess or overflow of material over and about the mold pocket or cavity is swept outwardly and off of the turn-table or mold plate. Such swept away material may be discharged into a suitable chute 45 or other form of conveyer, to be collected and returned to the feed hopper 23 (see Figs. 1 and 10).

Registered above the position of the mold pocket or cavity, as it dwells at station C, is a press plate mechanism. This press plate mechanism may be made and operated in various ways, but, as illustrated, comprises a presser plate 46, having a flat bottom formation conforming to the several sizes of building stone units making up the group thereof produced at one molding, such bottom formation being illustrated in Fig. 6 of the drawings. The presser plate 46 is fixed to the lower end of a vertically movable slide-rod 47, which slides in a suitable guide 48. The upper end of said slide rod is threaded through a worm gear 49 held in a housing 50 against vertical displacement, but free for rotation. Also journaled in said housing 50 is a worm 51 which meshes with said worm gear 49. Said worm 51 is driven by a shaft 52, and the shaft in turn may be actuated in desired timed relation to the movements of the turn-table or mold plate from any suitable source of power and by any suitable transmission mechanism adopted to produce desired forward and reverse movements of the shaft and worm and gear mechanism. While the mold pocket or cavity, having the supply of base plastic material therein, dwells at station C, the presser plate is forcibly driven downward by rotating the worm gear in one direction relative to the threaded end of the slide rod 47 (see Figs. 2 and 11). The downward movement of the presser plate brings the same into engagement with the base plastic material deposited in the mold pocket or cavity, and exerts a compacting and consolidating pressure thereon, the extent of the movement being controlled as to the height of the base material in the mold pocket to a point below the top level thereof thus leaving space for the deposit and reception of quantity of plastic facing or finishing material. Usually the depth of the space allowed would approximate one-half inch. When the base material has been thus compacted, the presser plate is raised by reversing the direction of rotation of the worm gear 49. It will be obvious that other forms of power transmission means for raising and lowering the presser plate 46 may be employed, the particular means above described and shown in the drawings being merely illustrative of one possible arrangement.

Upon completion of the pressing operation above described the turn table or mold plate is again caused to move, whereby the mold pocket or cavity is transferred from station C to station D. Suitably supported over the table and aligned with the path of movement of the mold pocket or cavity as it moves from station C to station D is a rake means 53 having a plurality of spring pressed yieldable rake rods or teeth 54. As the mold pocket or cavity, with the compacted base material therein, moves under and past said rake rods or teeth 54, the spring pressure on the latter will force their free ends into raking engagement with the surface of the base material within the mold pocket or cavity, so that said teeth will drag across such surface to somewhat roughen the latter, to the end that a better union or bond will be produced between the base material and the subsequently applied finishing or facing material (see Fig. 12).

Located adjacent to station D is a supply hopper 55 in which is deposited a supply of plastic facing or finishing material from which a finish facing coat of desired color is applied to and incorporated with the artificial stone building units produced by the operation of the machine. The facing or finishing material consists in a plastic cement having coloring matter incorporated therewith to produce artificial stone of the desired color, and also preferably includes waterproofing material to render the stone impervious to moisture. Said hopper 55 is substantially the same as the hopper 23 above described, and is provided with a shaft and paddle discharge means and transmission therefor similar to that described in connection with said hopper 23, and the parts of which are identified in the drawings by corresponding reference characters. Also, extending beyond the hopper 55, so as to surround the position of a mold pocket or cavity as it arrives and dwells at station D, is a coaming 56 for confining the plastic facing or finishing material delivered to the mold pocket or cavity against undue spreading or scattering on the surface of the turn-table or mold plate. As the turn-table or mold plate is rotated to carry a mold pocket or cavity from station C to station D, and as the mold pocket or cavity progresses beneath the hopper 55, the facing and finishing is delivered and spread over the top of the base material already within the mold pocket or cavity, so that a proper amount of the former material will be deposited by the time the mold pocket or cavity comes to rest at station D, (see Fig. 13).

Figure 14:
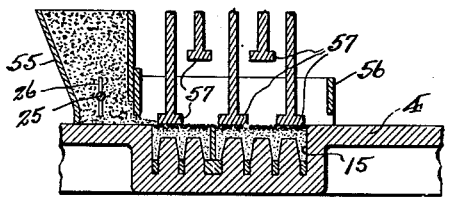
Figure 15:
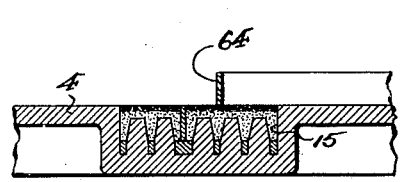
Figure 16:
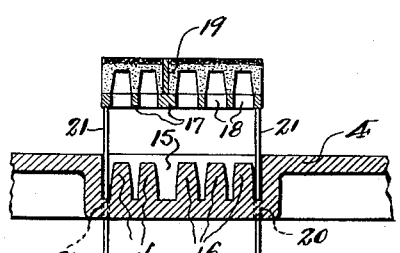

Registered above the position of the mold pocket or cavity, as it dwells at station D, is a final tamper mechanism. This tamper mechanism may also be made and operated in various ways, but as illustrated, comprises a series of vertically reciprocable tamping members 57 having supporting rods 58 vertically slidable in guides 58'. Each slide rod 58 possesses a fixed laterally projecting lift-tongue 59 and an offset guide-sleeve 60. The guide sleeves 60 are slidably engaged on fixed vertical guide-rods 61 which parallel said slide rods 58. Journaled in bearings connected with the frame-work 1, so as to lie adjacent to the slide rods 58 is a shaft 62 to which are fixed revolvable trip arms 63. Said shaft 62 may be rotated at proper times by any suitable form of power transmission, so that the trip arms 63 engage, lift and disengage the lift tongues 59 so as to raise and drop the tamping members 57. The action of the several tamping members may be alternated, and the pounding of the same serves to tamp or pack down the supplied layer of finishing or facing plastic material, so as to firmly bond the same to the base material, thus providing finished artificial stone units having the desired exterior finish and color at the exposed face thereof. Fig. 14 illustrates the final tamping operation, and Fig. 7 shows a bottom view of the group of tamping members 57.

The delivery and tamping of the plastic facing or finishing material having been completed, the turn-table or mold plate is again caused to move, whereby the mold pocket or cavity is transferred from station D to station A, having thereupon completed the circuit of the stations. Suitably fixed to extend over the surface of the turn-table or mold plate, at points intermediate stations D and A, is a strike-off plate 64, disposed edgewise to said surface. As the mold pocket or cavity travels beneath said strike-off plate 64, any excess or overflow of finishing or facing material over and about the mold pocket or cavity is swept outwardly from off of the turn-table or mold plate. Such swept away material may be discharged into a suitable chute 65 or other form of conveyer, to be collected and returned to the feed hopper 55 (see Figs. 1 and 15).

As the mold pocket or cavity containing the finished group of molded artificial building stone units comes to rest at station A, it is registered or aligned over the ejector device 22, which is timed to thereupon operate to cause an upward thrust of the lift rods 21. As the lift rods 21 rise through the turn-table or mold plate, the same will engage the underside of the base frame 17 and will push the same together, with the molded product, upwardly out of the mold pocket or cavity and will elevate the same above the surface of said turn-table or mold plate (see Fig. 16).

Means are provided to receive the thus ejected base frames and molded product. This means preferably comprises a transfer carriage 66, mounted, for movement toward and from the turn-table or mold plate, on an inclined trackway 67. Said transfer carriage is preferably counter-balanced by a weight 68. Any suitable form of endless take-away conveyer 69 may be employed in association with the transfer carriage and its trackway.

After the base frame 17, and the molded product supported thereon, is lifted out of the mold product or cavity, the transfer carriage 66 is moved forward so that its forward end passes beneath the raised base frame 17. The lift rods 21 are thereupon retracted, so that the base frame 17 and molded product is dropped down upon the carriage. The carriage is now run down the trackway, thereupon conveying the base-frame and molded product outwardly and downwardly until the base-frame is brought into contact with the conveyer 69, so that as the carriage moves on down, the base frame rests on the conveyer so as to move away, under the impulsion of the latter, to a convenient point for receiving and storing the product for final curing.

After the ejected base frame with its burden of molded product is removed from the mold pocket or cavity and carried away, an empty base frame is inserted in the same, and the above sequence of operations repeated.

The operations will be successively repeated as each mold pocket or cavity of the turn-table or mold plate progressively move from station to station as will be obvious.

From the above description it will be apparent that the novel machine, while relatively simple, is nevertheless admirably adapted to continuously carry on the molding operations in an efficient and comparatively rapid manner.

As many changes could be made in the above described mechanisms making up the machine and in the detail constructions of said mechanisms, and many widely different embodiments of this invention could be made without departing from the scope thereof, it is intended that all matter contained in the above description or shown in the accompanying drawings shall be interpreted as illustrative and not in a limiting sense.

What is claimed is:—

1. In a machine of the kind described, a rotatable turn-table having spaced mold pockets therein, removable supporting frames for insertion within said mold pockets, means operative during the circuit of said turn-table for delivering a base plastic material into said mold pockets, means operative at one point in the circuit of said turn-table for tamping the base plastic material into a mold pocket, means at another advanced point in the circuit of said turn-table for pressing the base plastic material below the top level of a mold pocket, means beyond said last named point operative during the circuit of said turn-table for delivering a finishing plastic material into a mold pocket containing said base plastic material, means operative at another advanced point in the circuit of said turn table for tamping said finishing plastic material into a mold pocket and into bond with base plastic material contained therein, and means operative at still another point in the circuit of said turn-table for raising out of a mold pocket a supporting frame bearing the finished molded product.

2. In a machine of the kind described, a rotatable turn-table having spaced mold pockets therein, removable supporting frames for insertion within said mold pockets, means operative during the circuit of said turn-table for delivering a base plastic material into said mold pockets, means operative at one point in the circuit of said turn-table for tamping the base plastic material into a mold pocket, means at another advanced point in the circuit of said turn-table for pressing the base plastic material below the top level of a mold pocket, means beyond said last named point operative during the circuit of said turn-table for delivering a finishing plastic material into a mold pocket containing said base plastic material, means operative at another advanced point in the circuit of said turn-table for tamping said finishing plastic material into a mold pocket and into bond with base plastic material contained therein, means operative at still another point in the circuit of said turn-table for raising out of a mold pocket a supporting frame bearing the finished molded product, a transfer carriage and inclined trackway therefor aligned opposite said last named point, and a conveyer means, said carriage being movable beneath a raised supporting frame bearing the molded product so as to receive the same whereby retraction of said carriage will carry and deposit said frame and molded product on said conveyer.

3. In a machine of the kind described, a rotatable turn-table having spaced mold pockets therein, removable supporting frames for insertion within said mold pockets, means operative during the circuit of said turn-table for delivering a base plastic material into said mold pockets, means operative at one point in the circuit of said turn-table for tamping the base plastic material into a mold pocket, a strike-off plate beyond said point and co-operative with the surface of said turn-table for removing over-flow base plastic material, means at another advanced point in the circuit of said turn-table for pressing the base plastic material below the top lever of a mold pocket, rake means beyond said last named point for roughening the exposed surface of the pressed base plastic material, means beyond said rake means operative during the circuit of said turn-table for delivering a finishing plastic material into a mold pocket containing said base plastic mateiral, means operative at another advanced point in the circuit of said turn-table for tamping said finishing plastic material into a mold pocket and into bond with base plastic material contained therein, and means operative at still another point in the circuit of said turn-table for raising out of a mold pocket a supporting frame bearing the finished molded pocket.

4. In a machine of the kind described, a rotatable turn-table having spaced mold pockets therein, removable supporting frames for insertion within said mold pockets, means operative during the circuit of said turn-table for delivering a base plastic material into said mold pockets, means operative at one point in the circuit of said turn-table for tamping the base plastic material into a mold pocket, a strike-off plate beyond said point and cooperative with the surface of said turn-plate beyond said point and cooperative with the surface of said turn-plate for removing over-flow base plastic material, means at another advanced point in the circuit of said turn-table for pressing the base plastic material below the top level of a mold pocket, rake means beyond said last named point for roughening the exposed surface of the pressed base plastic material, means beyond said rake means operative during the circuit of said turn-table for delivering a finishing plastic material into a mold pocket containing said base plastic material, means operative at another advanced point in the circuit of said turn-table for tamping said finishing plastic material into a mold pocket and into bond with base plastic material contained therein, means operative at still another point in the circuit of said turn-table for raising out of a mold pocket a supporting frame bearing the finished molded product, a transfer carriage and inclined trackway therefor aligned opposite said last named point, and a conveyer means, said carriage being movable beneath a raised supporting frame bearing the molded product so as to receive the same whereby retraction of said carriage will carry and deposit said frame and molded product on said conveyer.

In testimony, that I claim the invention set forth above I have hereunto set my hand this 16th day of September, 1929.

JAKOB KNECHT.